United States Patent [19]
Leupold

[11] Patent Number: 6,054,789
[45] Date of Patent: Apr. 25, 2000

[54] CYLINDRICAL PERMANENT MAGNET MAGIC RING ELECTRIC MOTOR AND GENERATOR

[75] Inventor: Herbert A. Leupold, Eatontown, N.J.

[73] Assignee: The United States of America as represented by the Secretary of the Army, Washington, D.C.

[21] Appl. No.: 09/034,073

[22] Filed: Mar. 3, 1998

[51] Int. Cl.[7] .................................................. H02K 21/12
[52] U.S. Cl. ........................ 310/156; 310/254; 310/178; 310/181
[58] Field of Search ................................... 310/156, 254, 310/178, 181

[56] References Cited

U.S. PATENT DOCUMENTS

| | | | |
|---|---|---|---|
| 3,906,321 | 9/1975 | Salihi | 318/439 |
| 4,924,125 | 5/1990 | Clark | 310/67 R |
| 5,337,472 | 8/1994 | Leupold . | |

*Primary Examiner*—Nestor Ramirez
*Assistant Examiner*—Thanh Lam
*Attorney, Agent, or Firm*—Michael Zelenka; George B. Tereschuk

[57] ABSTRACT

An electric motor or generator having a permanent magnet cylinder or stator comprised of a plurality of sections with each section having a predetermined magnetic orientation so as to create a relatively strong interior working space having a relatively strong magnetic field or flux therein. A cylindrical core formed of copper wires or conductors imbedded in a magnetic material is placed within the interior working space of the permanent magnet cylinder so as to be free to rotate along a longitudinal axis or in relation to the permanent magnet cylinder. Upon application of a current to the copper wires or conductors within the core, the core is caused to rotate or move in relation to the permanent magnet cylinder, forming an electric motor. Alternatively, when the core is mechanically rotated or moved in relation to the permanent magnet cylinder, current is induced in the conductors in the core, generating electricity. The magnetic orientation and arrangement of the sections making up the permanent magnetic cylinder has a "magic" ring configuration which results in a relatively strong interior working magnetic field with very little exterior magnetic flux leakage. An efficient, relatively compact, powerful electric motor or generator results.

7 Claims, 4 Drawing Sheets

CYLINDRICAL PERMANENT MAGNET MAGIC RING ELECTRIC MOTOR AND GENERATOR

GOVERNMENT INTEREST

The invention described herein may be manufactured, used, imported, sold, and licensed by or for the Government of the United States of America without the payment to me of any royalty thereon.

FIELD OF THE INVENTION

This invention relates in general to electric motors or generators, and more specifically to an electric motor or generator utilizing a cylindrical permanent magnet field source.

BACKGROUND OF THE INVENTION

There are many types of electric motors, for example, induction motors and commutator motors. All electric motors are based on the principles of Ampere's law and Faraday's law relating to the interrelationship between electrical current and magnetic fields. Most electric motors have a rotor and a stator that are interconnected or coupled by a magnetic field. Most electric motors and generators have a stator that creates a magnetic field induced by current in windings or coils forming the stator. The resulting stator, necessary to create a sufficiently large magnetic field, is usually large or heavy and is somewhat inefficient due to losses. Therefore, there is a need for a more compact, efficient electric motor or generator that has a stator that produces a relatively large magnetic field used to interact with a current carrying rotor.

SUMMARY OF THE INVENTION

The present invention is directed to an electric motor or generator utilizing a cylindrical permanent magnet composed of a plurality of sections, with each section having a predetermined magnetic orientation or magnetization direction. The predetermined magnetic orientation of each of the sections is arranged in order to create a relatively strong and uniform magnetic field within a central working space or bore of the cylinder. A core having copper wires imbedded therein is coaxially positioned within the bore of the permanent magnet cylinder and acts as a rotor or core. A current source supplies a current to a commutator, coupled to the copper wires in the core, causing current to flow within the copper wires. As a result the rotor or core rotates. An electric motor is therefore formed. Alternatively, a rotating device can mechanically rotate the rotor or core, inducing a current in the copper wires in the rotor or core thereby forming an electric generator. The sections of the permanent magnet cylinder are arranged such that the sections have a magnetic orientation forming a "magic" cylinder or ring which results in a relatively large magnetic field within the bore or central working space with very little magnetic flux leakage exterior to the central working space. In a preferred embodiment the outer magnetic cylinder rotates and the core remains stationary. This simplifies the required electrical connections with the core.

Accordingly, it is an object of the present invention to provide a compact efficient motor or generator that is relatively easily manufactured.

It is an advantage of the present invention that there is relatively little magnetic flux leakage external to the motor or generator.

It is a feature of the present invention that a permanent magnet cylinder having a plurality of sections with different radial magnetic orientations is used, producing a relatively strong magnetic field within a central working space.

These and other objects, advantages, and features will become readily apparent in view of the following detailed description.

DETAILED DESCRIPTION OF THE PREFERRED EMBODIMENT

Figure 1:
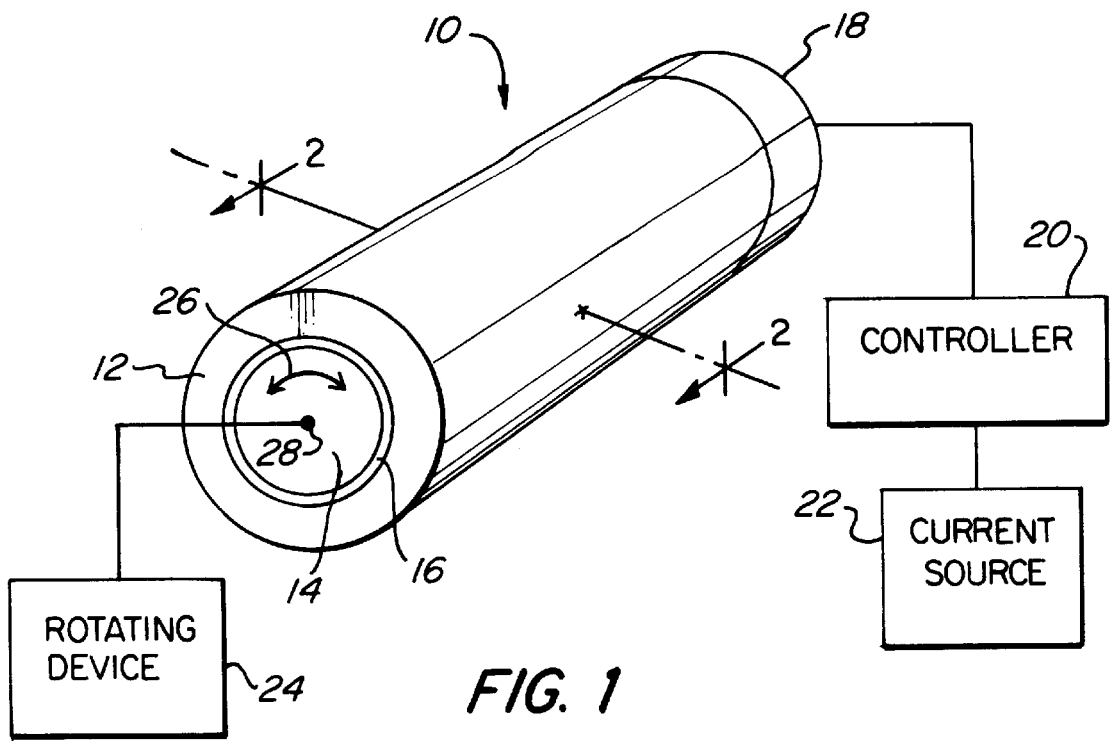
FIG. 1 schematically illustrates one embodiment of the present invention.

FIG. 1 schematically illustrates the present invention. An electric motor or generator 10 is illustrated. A permanent magnet cylinder 12 acts as a stator and forms a relatively strong magnetic field within a central working space or bore of the cylinder. A core 14 is coaxially placed within the central working space and acts as a rotor or armature. Between the core 14 and the permanent magnet cylinder 12, a gap 16 is formed. The gap 16 can be relatively small, and needs only to be sufficiently wide to permit the core 14 to turn. At one end of the permanent magnet cylinder 12 is a commutator 18. The commutator 18 is coupled to wires or windings in the core 14. The commutator 18 is coupled to a controller 20 which controls the current provided to the commutator 18 by the current source 22. The core or rotor 14 is coupled to a rotating device 24. The core 14 is caused to rotate about a longitudinal axis 28 in the direction of arrow 26. The electric motor 10 illustrated in FIG. 1 can operate as an electric motor or a generator or dynamo. If a current source 22 provides a current to the windings in core 14, the induced magnetic field causes core 14 to rotate, resulting in an electric motor. If a rotating device 24 mechanically rotates core 14, a current is induced in the windings in core 14, resulting in an electric generator or dynamo.

Figure 1A:
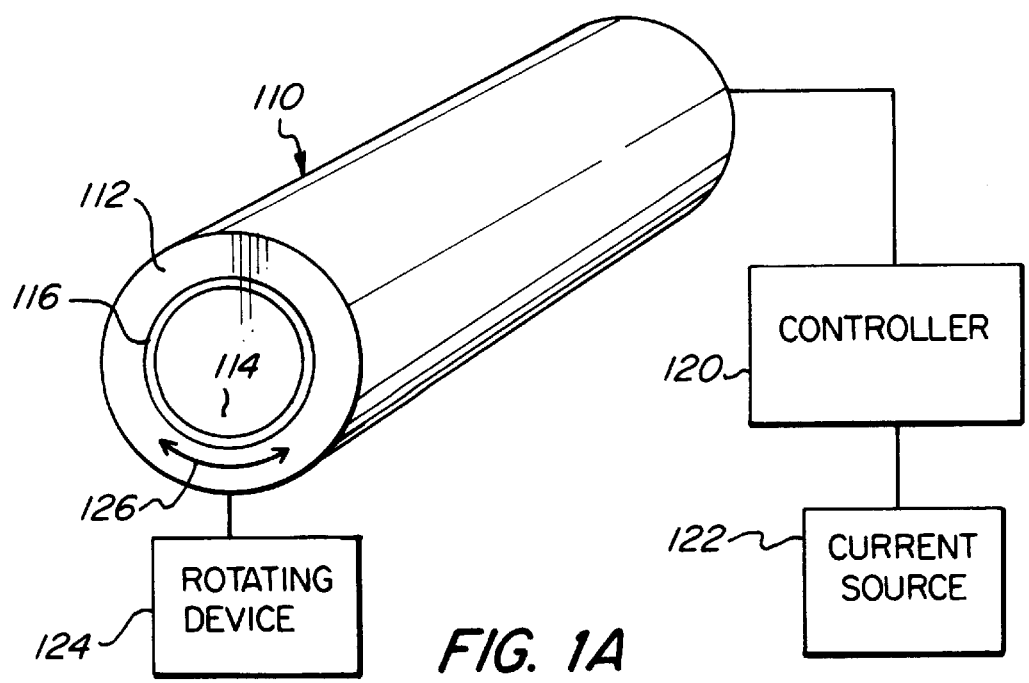
FIG. 1A schematically illustrates another embodiment of the present invention.

FIG. 1A illustrates a motor or generator 110. A permanent magnet cylinder 112 is free to rotate around a stationary core 114. A gap 116 is formed between the permanent magnet cylinder 112 and the stationary core 114. The gap 116 need only be sufficiently wide to permit the permanent magnet cylinder 112 to rotate freely around the stationary core 114. A controller 120 is attached to the stationary core 114 and controls the flow of current from current source 122. A rotating device may be attached to the permanent magnet cylinder 112. The permanent magnet cylinder 112 is free to rotate as indicated by the arrow 126. When the present invention is intended to function as a generator, mechanical work may be provided by the rotating device 124 to rotate the permanent magnet cylinder 112 inducing an electric current in core 114. When the present invention is intended to function as a motor, current from current source 122 may be provided to the stationary core 116 causing permanent magnet cylinder 112 to rotate turning the attached rotating device 124 producing work.

Figure 2:
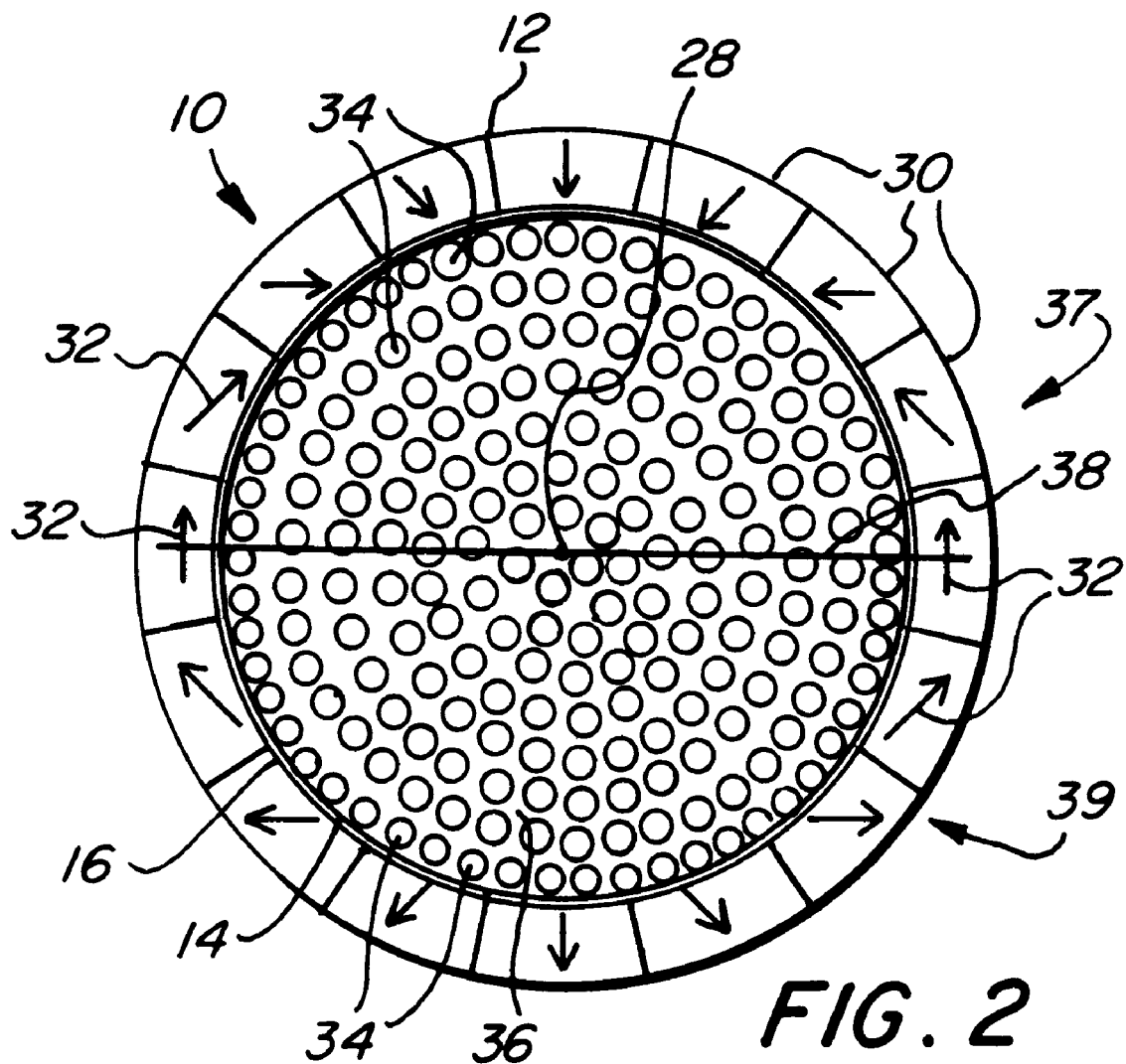
FIG. 2 is a cross section taken along line 2—2 in FIG. 1.

FIG. 2 is a cross section taken along line 2—2 in FIG. 1. FIG. 2 more clearly illustrates the permanent magnet cylinder 12 and the core 14. The permanent magnet cylinder 12 is comprised of a plurality of sections 30. Each of the plurality of sections has a magnetic orientation represented by arrows 32. The magnetic orientation represented by arrows 32 changes direction angularly while progressing around the central longitudinal axis 28. This arrangement of sections, having the predetermined magnetic orientation, is referred to as a "magic" ring or cylinder and provides a relatively large magnetic field within a central working space or bore. The permanent magnet cylinder 12 may be manufactured by known techniques. For example, by techniques disclosed in U.S. Pat. No. 5,337,472 entitled "Method Of Making Cylindrical And Spherical Permanent Magnet Structures" issuing to Leupold et al on Aug. 16, 1994, which is herein incorporated by reference. Core 14 is made of a passive magnetic material 36, such as iron, with copper wires 34 imbedded or riddled therein. The copper wires 34 form windings through which electric current travels. The copper wires 34 are divided into at least two sections so as to permit current to flow in different directions. Typically, the two sections will be semi-cylindrical with one section 37 on one side of an equator 38 and another section 39 on the other side of the equator 38. Each section 37 and 39 is coupled to a current source. The structure illustrated in FIG. 2 also applies generally to the embodiment illustrated in FIG. 1A.

Figure 3:
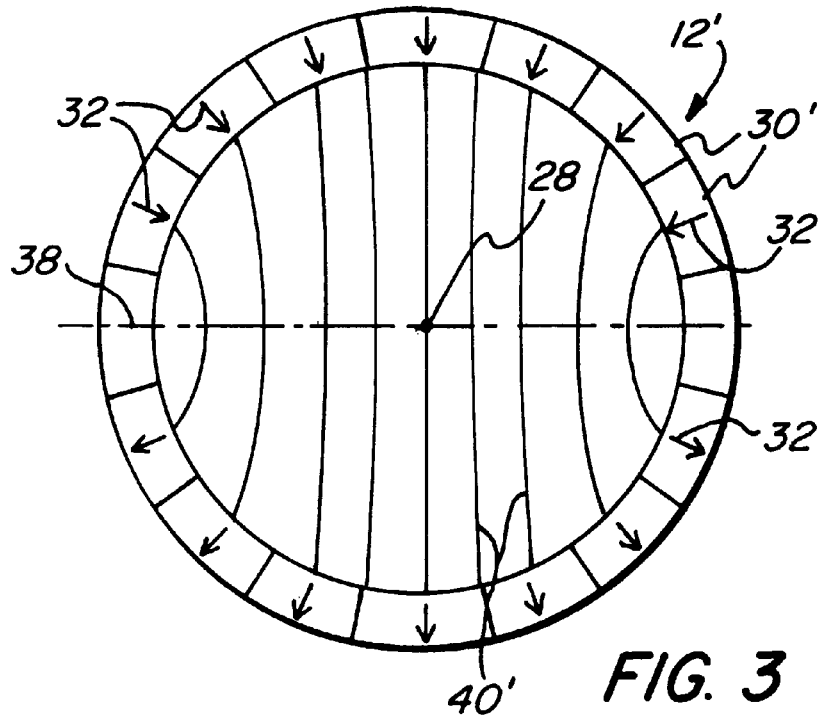
FIG. 3 illustrates the magnetic orientation of the sections forming the permanent magnet cylinder.

FIG. 3 illustrates a relatively simple permanent magnet cylinder 12' that has a plurality of permanent magnet sections 30'. Each of the permanent magnet sections 30' have a magnetic orientation represented by arrows 32. This predetermined magnetic orientation creates lines of force, magnetic field lines, or flux 40'. These magnetic field lines 40' are nearly parallel at the center of the bore near the longitudinal axis 28.

Figure 4:
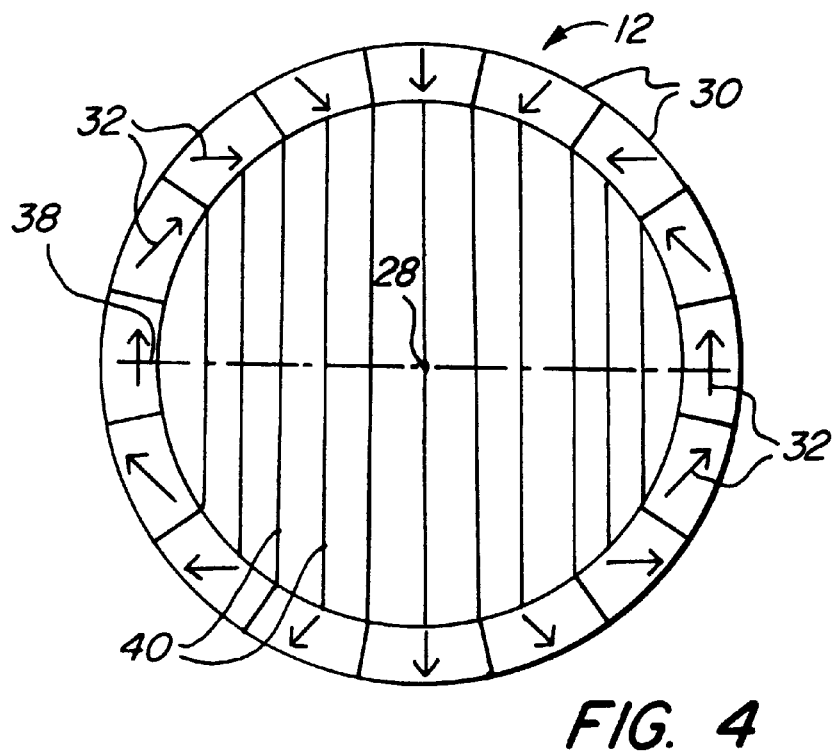
FIG. 4 illustrates the magnetic orientation of the sections of the permanent magnet cylinder in another embodiment.

FIG. 4 illustrates permanent magnet cylinder 12, illustrated in FIG. 1, FIG. 1A, and FIG. 2, with permanent magnet sections 30 having a predetermined magnetic orientation as illustrated by arrows 32, which produces lines of force, magnetic field lines or flux 40 within the interior central working space or bore. This predetermined magnetic orientation of the sections 30 results in a relatively strong magnetic field within the interior central working space or bore. The magnetic field, illustrated by magnetic field lines 40, is relatively uniform throughout the interior central working space or bore. This is illustrated by the magnetic field lines 40 being substantially parallel. The magnet structure illustrated in FIG. 4 is preferable relative to the magnet structure illustrated in FIG. 3 because the magnet structure illustrated in FIG. 4 provides a stronger more uniform magnetic field relative to the amount of magnet material used.

Figure 5:
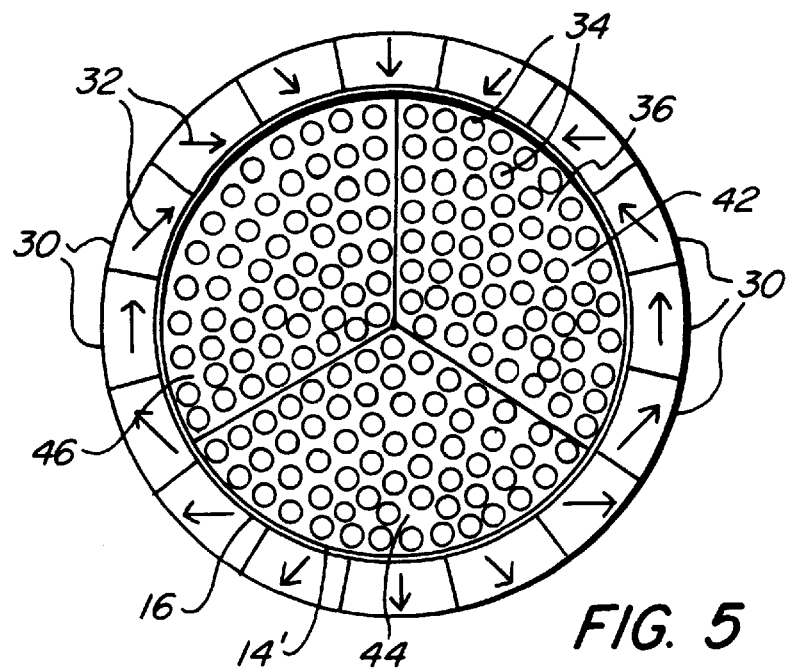
FIG. 5 illustrates an embodiment of the present invention relating to three-phase operation.

FIG. 5 illustrates another embodiment of the present invention as applied to three-phase operation. The core 14' is divided into a first core portion 42, a second core portion 44, and a third core portion 46. The dividing of the core 14' into the three portions 42, 44, and 46 permit the motor or generator to operate with three phases.

Figure 6:
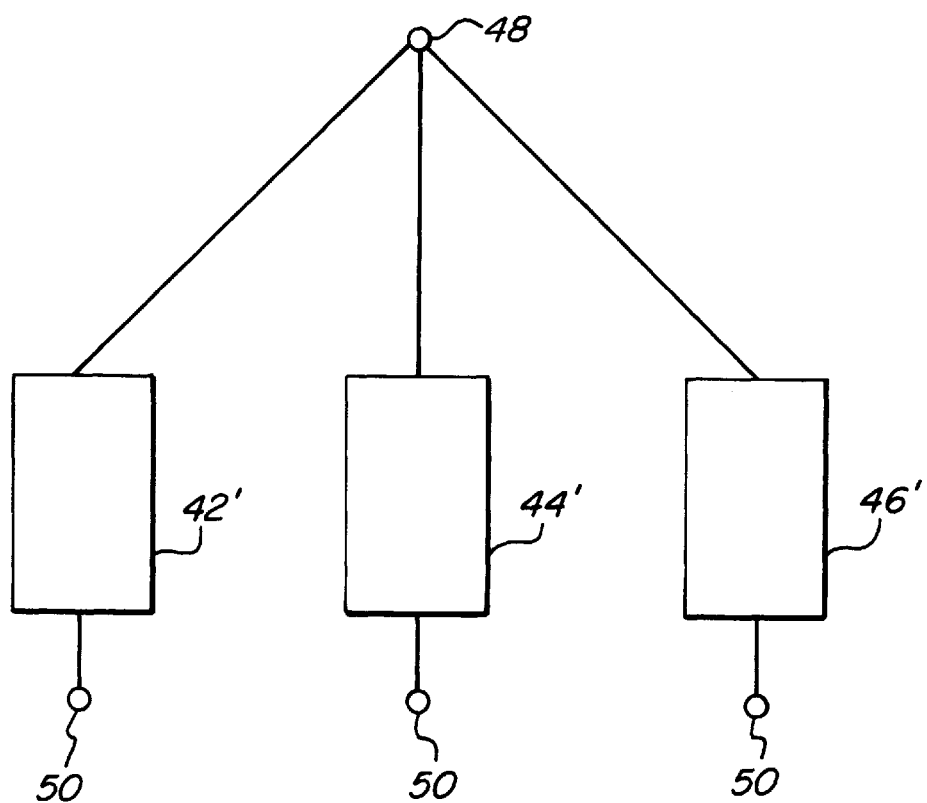
FIG. 6 schematically illustrates the three-phase operation illustrated in the embodiment of FIG. 5.

FIG. 6 schematically illustrates this three-phase operation. A ground 48 is coupled to a first core portion 42', a second core portion 44', and a third core portion 46', which in turn are coupled to a load 50. Accordingly, the embodiment of the present invention illustrated in FIG. 5 is easily utilized for acting as a generator to provide three phase alternating current.

The operation of the present invention can readily be appreciated with reference to FIGS. 1–6. The copper wires 34 imbedded in the passive magnetic material 36 below an equator 38 could be in parallel, and connected in series with copper wires 34 above the equator 38 to form an efficient closed loop. Accordingly, when operated as a motor, current is caused to travel in one direction in the copper wires 34 above the equator 38 and in another direction in the copper wires below the equator 38, the relatively strong transverse magnetic field formed within the interior central working space or bore of the cylindrical permanent magnet 12 will create a force causing relative movement between the core 14 and the cylindrical permanent magnet 12. Alternatively, the present invention may be operated as an electric generator by a mechanical rotation of the core 14 or cylindrical permanent magnet 12, which induces a current to flow within the copper wires 34 resulting in the generation of an electric current. It should be appreciated that while the present invention is described in a configuration such that the permanent magnet cylinder is a stator and the core 14 is a rotor, the core 14 could be held stationary and the permanent magnet cylinder 12 could be rotated. This is illustrated in FIG. 1A. The permanent magnet cylindrical structure 12' illustrated in FIG. 3 creates a relatively strong and efficient magnetic field source. The effects of the magnetic poles that this radially oriented magnetization pattern places on the outer and inner surfaces of the permanent magnet cylinder nearly or substantially cancels each other, and the magnetic field in the interior of the cylindrical permanent magnet cylinder arises solely from the volume pole distribution in the magnetized permanent magnet cylinder. The pole density comes about because of the variation in magnetization direction represented by $$\gamma = \theta$$

where $\gamma$ is equal to the variation in magnetization direction and $\theta$ is equal to the angle progressing around the longitudinal axis 28.

The pole density $\rho$ is given by, $$\rho = -\nabla \cdot \overline{M}$$

where $\overline{M}$ is the magnetization and, $$\nabla \cdot \vec{M} = \frac{1}{r}\frac{\partial(-rM_\gamma)}{\partial r} + \frac{1}{r}\frac{\partial(M_\theta \cos\theta)}{\partial \theta}$$

but, $$|\overline{M}| = M_r$$

and $$M_\theta = 0$$

then, $$\rho = \nabla \cdot \vec{M} = 0 + \frac{|\vec{M}_\gamma|}{r}$$

FIG. 4 illustrates a permanent magnet cylinder having a magnetic orientation represented by arrows 32, which has a magnetic orientation given by $$\gamma = 2\theta$$

which is referred to as the "magic" ring formula. A plurality of permanent magnet sections having a magnetic orientation and arranged according to this formula forms a "magic" ring. As can be seen from FIG. 4, the magnetic orientation reverses direction every ninety degrees or one quarter section while progressing around the cylinder.

Accordingly, the field of the inner and outer surface charge layers still cancel, but the volume pole density is, $$\rho = \frac{1}{r}\frac{\partial(-rM_\gamma)}{\partial r} + \frac{1}{r}\frac{\partial(M_\theta\cos\theta)}{\partial\theta}$$

but $$M_\gamma = |M|\sin\theta$$
$$M_\theta = |M|\cos\theta$$

$$\rho = \frac{2|M|\sin\theta}{r}$$

On average, this exceeds the volume pole density of the permanent magnetic cylinder illustrated in FIG. 3, so greater flux density will be produced in the interior central working space or bore, with a greater total flux linkage as well.

For example, the total flux per unit length traversing the equator of a cylinder with an inner radius of 1.455 cm and an outer radius of 1.902 cm and comprised of material with $B_r$ equal to 12 kG when the inner interior cavity is filled with iron riddled with copper is 17.7 $kM_x$ in the embodiment illustrated in FIG. 3, radial magnetic orientation, and 28.0 $kM_x$ for the embodiment illustrated in FIG. 4, "magic" ring magnetic orientation. This is a substantial increase. Additionally, in the embodiment illustrated in FIG. 4, the flux is uniformly distributed, while in the embodiment illustrated in FIG. 3, the magnetic flux is heavily weighted toward the equator where many of the copper conducting wires are not cut by the magnetic flux.

Accordingly, the present invention, in utilizing a permanent magnet cylinder comprised of sections having a predetermined magnetic orientation, produces a working space having a strong magnetic field or flux in a relatively compact and easily manufactured shape. As a result, efficient and powerful electric motors or generators can be made resulting in the manufacture of smaller and more powerful devices. While the term generator and motor have been used to refer to a particular application of the present invention, the term rotating electric device is intended to apply to the present invention whether operated as either a generator or motor. It should be noted that presence of the iron or other passive magnetic material in the core increases the flux but decreases the amount of high-conductivity copper. The passive material conducts some current but not nearly as much as the copper. Also it generates more heat. Therefore, the passive magnetic material to copper ratio chosen would depend on circumstances of operation and the kind of passive material used. If no passive material is used the copper could be in the form of two semi-cylindrical bars for maximum packing. Individual wires may be better to eliminate azimuthal eddy currents and the losses they entail, especially if the copper wires are insulated.

Additionally, while several embodiments have been illustrated and described, it will be obvious to those skilled in the art that various modifications may be made without departing from the spirit and scope of this invention.

What is claimed is:

1. A permanent magnet electric device comprising:
    a plurality of permanent magnet sections, said plurality of permanent magnet sections forming a cylinder having a longitudinal axis and a longitudinal bore, each of said plurality of permanent magnet sections having a magnetic orientation and arranged to form a magic ring;
    a core made of a passive magnetic material, said core being rotatable and free to rotate within the longitudinal bore relative to the cylinder formed by said plurality of permanent magnet sections;
    a plurality of copper wires longitudinally embedded in said core forming windings;
    said magnetic orientation given by the formula:

$$\gamma = 2\theta$$

where said $\gamma$ is equal to a variation in magnetization direction and said $\theta$ is equal to an angle progressing around said longitudinal axis;
    device having a uniformly distributed magnetic flux;
    a commutator coupled to said plurality of copper wires;
    a controller coupled to said commutator; and
    a current source coupled to said controller;
    whereby when an electric current is caused to travel within said plurality of copper wires an induced field interacts with the magnetic field created by said plurality of permanent magnet sections causing said core to rotate relative to said plurality of permanent magnet sections.

2. The permanent magnet electric device, as recited in claim 1, further comprising said cylinder being free to rotate about said core.

3. The permanent magnet electric device, as recited in claim 2, further comprising:
    a rotating means;
    said rotating means being connected to said core;
    said rotating means mechanically rotates said core; and
    an electrical current is induced within said plurality of copper wires.

4. The permanent magnet electric device, as recited in claim 3, wherein said device is employed as an electric generator.

5. The permanent magnet electric device, as recited in claim 4, wherein said device is employed as a dynamo.

6. The permanent magnet electric device, as recited in claim 2, further comprising:
    a rotating means;
    said core remains stationary;
    said rotating means is connected to said cylinder and rotates said cylinder about said core; and
    said rotating cylinder induces an electric current in said core to function as a generator.

7. The permanent magnet electric device, as recited in claim 6, further comprising:
    said core remains stationary; and
    wherein said rotating cylinder causes said rotating means to rotate and produce work.

* * * * *